United States Patent [19] [11] 4,120,806
Watanabe et al. [45] Oct. 17, 1978

[54] HEXAGONAL-SYSTEM FERRITE POWDER, COMPOSITE PLASTIC-FERRITE MAGNET COMPRISING SAME AND PROCESS FOR PRODUCTION THEREOF

[75] Inventors: Yasuo Watanabe; Seizi Isoyama, both of Okayama, Japan

[73] Assignee: Dowa Mining Co., Ltd., Tokyo, Japan

[21] Appl. No.: 878,022

[22] Filed: Feb. 15, 1978

Related U.S. Application Data

[62] Division of Ser. No. 826,704, Aug. 22, 1977.

[30] Foreign Application Priority Data

Aug. 30, 1976 [JP] Japan .................................. 51-103356
Aug. 30, 1976 [JP] Japan .................................. 51-103357

[51] Int. Cl.$^2$ ...................... C04B 35/26; H01F 1/117
[52] U.S. Cl. ............................... 252/62.54; 252/62.62; 252/62.63
[58] Field of Search ............... 252/62.53, 62.54, 62.62, 252/62.63

[56] References Cited

U.S. PATENT DOCUMENTS

| | | | |
|---|---|---|---|
| 3,184,807 | 5/1965 | Schornstheimer et al. ... | 252/62.54 X |
| 3,371,044 | 2/1968 | Cochardt ........................... | 252/62.54 |
| 3,428,603 | 2/1969 | Kroenke ............................ | 252/62.54 |
| 3,634,254 | 1/1972 | Micheli ............................. | 252/62.63 |
| 3,764,539 | 10/1973 | Cochardt et al. ................. | 252/62.54 |
| 3,855,374 | 12/1974 | Brailowsky et al. .............. | 264/24 |
| 3,928,709 | 12/1975 | Audran et al. .................... | 428/539 |
| 4,042,516 | 8/1977 | Matsumoto et al. .............. | 252/62.54 |

Primary Examiner—F.C. Edmundson
Attorney, Agent, or Firm—Flynn & Frishauf

[57] ABSTRACT

A novel hexagonal-system ferrite powder having surprisingly high coercive force as well as other excellent performance characteristics is disclosed. The ferrite powder is prepared by co-precipitating ferrous hydroxide and a metal carbonate in a liquid phase under specified conditions, followed by calcinating the resulting co-precipitated product under specified temperature conditions. The ferrite powder thus obtained has a good miscibility with a plastic material and is suitable for making a composite plastic-ferrite magnet.

9 Claims, No Drawings

HEXAGONAL-SYSTEM FERRITE POWDER, COMPOSITE PLASTIC-FERRITE MAGNET COMPRISING SAME AND PROCESS FOR PRODUCTION THEREOF

This is a division of application Ser. No. 826,704, filed Aug. 22, 1977.

The present invention relates to a hexagonal-system ferrite powder, a composite plastic-ferrite magnet comprising the same and processes for the production of them.

In one aspect, the present invention relates to a hard-ferrite powder having excellent performance characteristics and a process for the production thereof. More particularly, the invention relates to a hexagonal-system ferrite powder having particularly improved coercive force and a process for the production thereof, said process comprising the two steps: the first step in which a co-precipitated product of ferrous hydroxide and a metal carbonate is formed in a liquid phase under specified conditions; and the second step in which the co-precipitated product thus obtained is subjected to calcination treatment under specified temperature conditions.

Heretofore, a hexagonal-system ferrite powder has been prepared mostly by a dry process which depends on a solid phase reaction. For example, barium ferrite is usually prepared by the following process, although some processing conditions are different depending on whether isotropic or anisotropic magnet is wanted. Namely, in the first step iron oxide and barium carbonate are mixed with each other in accordance with the predetermined formulation. Then, the mixture is calcined at a temperature in the range of 1,000°–1,300° C. followed by grinding the calcined product and molding the resulting powder to any of the desired shapes by a conventional molding method such as "pressure molding", "in-magnetic field molding" and the like before the molded material is sintered to obtain the end product. When ferrite is prepared by the process as mentioned above which is based on a solid phase reaction, the calcination temperature has to be at least 1,000° C. or so to ensure the fair progress of ferrite-forming reaction. As a result of carrying out the calcination at such a high temperature, a sintered mass forms due to the agglomeration of molten grains and the individual grains grow into coarser size during the progress of calcination. All of these are considered to exert an adverse effect on the magnetic properties of the resulting ferrite.

On the other hand, a wet process is also known, in which the production of ferrite is carried out in a liquid phase. However, the conventional wet process has a defect in that the co-precipitated product obtained in the liquid phase is too minute, and accordingly, the filtration thereof for the separation from liquid is very difficult. In addition, the precipitated product is generally accompanied by considerable amounts of alkalis and other contaminants. For these reasons, it is rather difficult to obtain the precipitated product having a composition which meets the predetermined molar proportions of respective components. Because of these defects, the commercialization of a wet process has not been realized yet. In addition, these defects may also be a bar to the production of a hexagonal-system ferrite powder having a high level coercive force which is one of the important characteristic properties of a hard ferrite.

In the conventional dry process, the adjustment of grain size is often carried out by mechanical crushing, which generally gives impact strain to individual ferrite grains. On the other hand, in the conventional wet process, the grain size of the reaction product obtained is unacceptably fine. It is known that the coercive force of the produced ferrite is adversely affected by either of the matters mentioned above. Namely, the strength of coercive force of a ferrite powder largely depends on the grain size of the ferrite. For example, if a ferrite powder contains coarse grains 1.0 micron or greater in diameter, as is often the case with the conventional dry process, the coefficient of diamagnetic field increases and the remarkable reduction in magnetic value is observed. On the other hand, if the grain size is extremely fine, for example as fine as 0.2 micron or less, the grains exhibit "super-paramagnetism", which may constitute one important reason for the reduction of coercive force. It is generally considered that a hard ferrite powder having the maximum coercive force is obtained when the grain size is adjusted to be within the range of 0.5 – 1.0 micron.

The present invention is to provide a novel process for the production of a hexagonal-system ferrite powder which is entirely different from any of the above mentioned conventional dry and wet processes. As will be explained in more detail later, a ferrite powder having the preferred range of grain size as mentioned above is easily obtained according to this process, which of course means that the production of a ferrite powder having high coercive force is ensured.

The process of the present invention comprises two major steps: the first step in which a co-precipitated product is formed in a liquid phase under controlled conditions; and the second step in which the co-precipitated product thus obtained is subjected to heat treatment at a relatively low temperature to carry out the ferrite-forming reaction. The temperature in the second step at which said heat treatment is carried out is much lower than the temperature generally employed in the prior art dry process. This process enables the easy production of a hard ferrite powder having a proper range of grain size, free from strain due to crushing and having excellent coercive force.

The outline of the process of the present invention can be explained as follows by the reaction formulas.

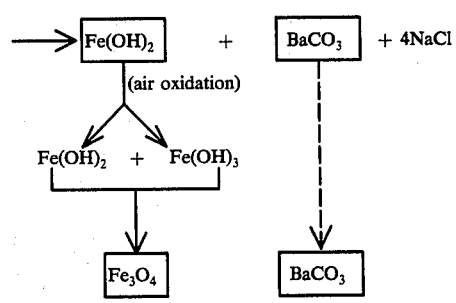

Namely, to carry out the reaction in the first step which is represented by the numerical identification (1) as given above, a solution of $FeCl_2$ and $BaCl_2$ containing equimolar $Fe^{2+}$ and $Ba^{2+}$ ions is added to a solution of equimolarly mixed alkalis such as, for example, a solution of NaOH or KOH and $Na_2CO_3$. Then, air is bubbled into the mixed solution at a constant rate (preferably at a flow rate of 4.0 – 5.0 liters/min., providing the reaction is carried out in a 10 liter-capacity beaker, i.e. air being blown at a rate of 29 – 36 kg/m$^3$.Hr), while the solution is agitated and kept at a pH in the range of 9 – 12, preferably 9 – 10 and a temperature in the range of 50° – 80° C., preferably 50° – 70° C. throughout the reaction. By this, the oxidation of the precipitated product, particularly the oxidation of Fe$^{2+}$ to Fe$^{3+}$ is carried out. When part of the Fe$^{2+}$ ions in the solution are oxidized to the Fe$^{3+}$ ions, Fe(OH)$_2$ and Fe(OH)$_3$ react with each other to gradually form Fe$_3$O$_4$. The Fe$_3$O$_4$ thus formed in the solution co-precipitates with BaCO$_3$ which is simultaneously formed in the solution, at a good efficiency.

In a conventional wet process, the precipitated product thus formed in a liquid phase consists of extremely fine grains and accordingly the filtration thereof is almost impossible, and in addition, because of the concomittant precipitation of various coexisting ions and alkalis to be associated with said fine grains, the removal of such contaminants can not be done by the conventional washing. Thus, it is very difficult to obtain a co-precipitated product having a composition which satisfies the predetermined molar fractions. In contrast, if the co-precipitated product is formed in a liquid phase under controlled conditions according to the present invention, a product free from alkalis and other coexisting ions and consisting of proper and relatively coarse size grains such as in the range of 0.5 – 0.7 micron is easily obtained. The precipitate thus obtained has good filtering characteristics. If the process is carried out under the conditions more severely controlled with respect to the liquid temperature, the reaction time and the like, a coprecipitated product having a composition approximately equal to the predetermined formulation for obtaining hexagonal-system ferrite and consisting of grains having the proper grain size in the range of 0.2 – 1.0 micron can be obtained rather easily. The process of the present invention makes possible the formation in a liquid phase of a precipitate which meets the predetermined formulation, something considered very difficult heretofore, and also provides a co-precipitated product, from which co-precipitated ions and alkalis as contaminant can be removed rather easily only by washing several times with water.

In the first step of the process of the present invention, the co-precipitated product having the characteristic properties as mentioned above is obtained. The product is further treated in the second step for the formation of almost complete hexagonal-system ferrite powder. Namely, in the second step, the co-precipitated product obtained in the first step is subjected to calcination treatment, which is carried out in a heat-treating furnace (2 inch-tube furnace) at a temperature in the range of 400° – 900° C., preferably in the range of 500° – 900° C., or alternatively, with O$_2$ gas being blown at a rate of 0.2 – 0.5 liter/min. (1.6 – 4.0 kg/m$^3$.Hr), at a temperature in the range of 400° – 900° C., preferably 400° – 600° C. and most preferably 500° – 550° C. for 30 minutes to 3 hours, preferably for 30 minutes to 2 hours, to thereby carry out the ferrite-forming reaction. The heat-treating temperature employed in the second step according to the present invention is much lower than the calcinating temperature generally employed in the prior art dry process. However, since this heat treatment is carried out not singly but in combination with the first step mentioned above, almost complete hexagonal-system ferrite can be formed. When a sample of the ferrite thus obtained is identified by the X-ray diffractometry, a diffraction pattern typical of magnet plumbite is confirmed, which shows that the ferrite thus obtained has a good crystallizing in spite of the fact that the calcination is carried out at a temperature range much lower than that employed in the prior art dry process. The ferrite powder thus obtained had a coercive force (IH$_c$) in the range of 4800 – 5300 oersteds (Oe), and a saturation magnetization in the range of 50.0 – 65.0 emu/g. The average grain size of the powder was in the range of 0.5 – 0.9 micron. Since the process of the present invention contains a liquid phase reaction in the first step, the reactivity of the powdered material to be calcined in the second step is remarkably high as compared with that obtained in the prior art dry process which depends on a solid phase reaction. For this reason, the ferrite-forming reaction proceeds satisfactorily within temperature range as low as 400° – 600° C. Thus, the process is almost free from such defects as unacceptable growth of grains and the appearance of strains in the grains, both of which are closely related to the reduction in coercive force. The ferrite powder of the present invention thus obtained is available as a raw material for preparing a hard ferrite powder to be incorporated in a plastic material for obtaining a plastic-ferrite composite magnet. When used for such purpose, the ferrite powder exhibits improved magnetic properties as compared with the prior art product. It has a high coercive force and a good miscibility with a plastic material, which ensures the preparation of a composition containing high percentage of the ferrite powder.

The following examples are given to illustrate but not to limit the present invention.

EXAMPLE 1

A mixed solution consisting of 275 ml of an FeCl$_2$ solution having a concentration of 1.0 mol/liter and 25 ml of a BaCl$_2$ solution having a concentration of 1.0 mol/liter and 25 ml of a BaCl$_2$ solution having a concentration of 1.0 mol/liter was added to a mixed alkali solution consisting of 550 ml of an NaOH solution having a concentration of 1.0 mol/liter and 50 ml of an Na$_2$CO$_3$ solution having a concentration of 1.0 mol/liter, and air was blown into the resulting mixture at a rate of 4.0 – 5.0 (29 – 36 kg/m$^3$.Hr.) liters/min. to produce fine bubbles, while the solution was kept at a pH of 9 – 10 and at a temperature of 50° – 60° C. for the purpose of oxidizing part of the Fe$^{2+}$ ions of the Fe(OH)$_2$ precipitate formed in the solution into the Fe$^{3+}$ ions to allow the formation of Fe$_3$O$_4$ precipitate in the same solution. The coprecipitated product of this Fe$_3$O$_4$ containing the concomittantly precipitated BaCO$_3$ was separated from the solution and was washed with water several times followed by filtering and drying. Then, the dried product was placed in an electric muffle furnace to be subjected to calcination treatment at a temperature of 550° C. for 1 hour, while a stream of gaseous O$_2$ was introduced into the furnace at a rate of 0.2 – 0.5 liter/min. (1.6 – 4.0 kg/m$^3$.Hr.). The powder thus obtained was examined by X-ray diffractometry and observed to exhibit the diffraction pattern of magnet plumbite. The saturation magnetization ($\delta_s$) thereof determined by a magnetic balance was 60.5 emu/g, the coercive force (IH$_c$) of the same was 4700 Oe, the molar ratio of Fe$_2$O$_3$ to BaO (Fe$_2$O$_3$/BaO) determined by chemical analysis was 5.53 and the average grain size of the powder was 0.5 micron.

EXAMPLE 2

A mixed solution consisting of 5.5 liters of an $FeCl_2$ solution having a concentration of 1.0 mol/liter and 0.5 liter of an $SrCl_2$ solution having a concentration of 1.0 mol/liter was added to the separately prepared mixed alkali solution consisting of 11 liters of NaOH solution having a concentration of 1.0 mol/liter and 1.0 liter of an $Na_2CO_3$ solution having a concentration of 1.0 mol/liter and air was blown into the resulting mixture at a rate of 4.5 liters/min. (33 kg/m$^3$.Hr.) to form fine bubbles, while the solution was kept at a pH of 10 and at a temperature of 70° C. for the purpose of oxidizing part of the $Fe^{2+}$ ions of the $Fe(OH)_2$ precipitate formed in the solution into the $Fe^{3+}$ ions to allow the formation of a co-precipitated product of $Fe_3O_4$ and $SrCO_3$ in the same solution. The co-precipitated product thus obtained was separated from the solution and was washed with water several times, followed by filtering and drying. Then the dried product was placed in an electric muffle furnace to be calcined therein at a temperature of 600° C for 1 hour, while a stream of gaseous $O_2$ was introduced into the furnace at a rate of 0.2 - 0.5 liter/min. (1.6 - 4.0 kg/m$^3$.Hr). The powder thus obtained was identified as $SrO.6FE_2O_3$ by X-ray diffractometry. Its coercive force was 5100 Oe and the saturation magnetization ($\delta_s$) was 59.0 emu/g.

EXAMPLE 3

A mixed solution consisting of 5.5 liters of an $FeCl_2$ solution having a concentration of 1.0 mol/liter, 0.375 liter of a $BaCl_2$ solution having a concentration of 1.0 mol/liter and 0.125 liter of an $SrCl_2$ solution having a concentration of 1.0 mol/liter was added to the separately prepared mixed alkali solution consisting of 11 liters of an NaOH solution having a concentration of 1.0 mol/liter and 1.0 liter of an $Na_2CO_3$ solution having a concentration of 1.0 mol/liter, and air was blown into the resulting mixture at a rate of 5.0 liters/min. (36 kg/m$^3$.Hr) to form fine bubbles, while the solution was kept at a pH of 11 and at a temperature of 80° C. for the purpose of oxidizing part of the $Fe^{2+}$ ions of the Fe-$(OH)_2$ precipitate formed in the solution into the $Fe^{3+}$ ions to allow the formation of a co-precipitated product of $Fe_3O_4$, $BaCO_3$ and $SrCO_3$ in the same solution. The co-precipitated product thus obtained was separated from the solution and washed with water, followed by filtering and drying. Then the dried product was placed in an electric muffle furnace to be calcined therein at a temperature of 600° C. for 1 hour, while a stream of gaseous $O_2$ was introduced into the furnace at a rate of 0.2 - 0.5 liter/min. (1.6–4.0 kg/m$^3$.Hr). The powder thus obtained was identified by X-ray diffractometry as a solid solution of $BaO.6Fe_2O_3$ and $SrO.6Fe_2O_3$. Its coercive force was 5500 Oe and the saturation magnetization ($\delta_s$) thereof determined by a magnetic balance was 60.5 emu/g. The composition was determined by chemical analysis as being $Ba_{0.75}.Sr_{0.25}O.5.53Fe_2O_3$.

EXAMPLE 4

A mixed solution consisting of 5.5 liters of an $FeCl_2$ solution having a concentration of 1.0 mol/liter, 0.45 liter of an $SrCl_2$ solution having a concentration of 1.0 mol/liter and 0.05 liter of a $CaCl_2$ solution having a concentration of 1.0 mol/liter was added to the separately prepared mixed alkali solution consisting of 11.0 liters of an NaOH solution having a concentration of 1.0 mol/liter and 1.0 liter of an $Na_2CO_3$ solution having a concentration of 1.0 mol/liter, and air was blown into the resulting mixture at a rate of 5.0 liters/min. (36 kg/m$^3$.Hr.) to form fine bubbles, while the solution was kept at a pH of 10.5 and at a temperature of 75° C. After 4 hours, a co-precipitated product of $Fe_3O_4$, $SrCO_3$ and $CaCO_3$ was obtained. Then, the co-precipitated product thus obtained was treated in the same manner as in Example 1. The powder eventually obtained was identified by X-ray diffractometry as the Ca-replaced solid solution of $SrFe_{12}O_{19}$ and had a coercive force of 4900 Oe and a saturation magnetization ($\delta_s$) of 61.5 emu/g. The chemical analysis showed the composition of $Sr_{0.9}Ca_{0.1}O.5.54Fe_2O_3$.

EXAMPLE 5

A mixed solution consisting of 5.5 liters of an $Fe(NO_3)_2$ solution having a concentration of 1.0 mol/liter, 0.225 liter of an $Sr(NO_3)_2$ solution having a concentration of 1.0 mol/liter, 0.05 liter of a $Pb(NO_3)_2$ solution having a concentration of 1.0 mol/liter and 0.9 liter of a $Ba(NO_3)_2$ solution having a concentration of 0.25 mol/liter was added to the separately prepared mixed alkali solution consisting of 11.0 liters of an NaOH solution having a concentration of 1.0 mol/liter and 1.0 liter of an $Na_2CO_3$ solution having a concentration of 1.0 mol/liter, and air was blown into the resulting mixture at a rate of 5.0 liters/min. (36 kg/m$^3$.Hr.) to form fine bubbles, while the solution was kept at a pH of 11.0 and a temperature of 70° C. After 4 hours, a co-precipitated product of $Fe_3O_4$, $BaCO_3$, $SrCO_3$ and $PbCO_3$ was obtained. The co-precipitated product thus obtained was treated in the same manner as in Example 1. The powder thus obtained was identified as the Sr, and Pb-replaced solid solution of $BaFe_{12}O_{19}$ and had a coercive force of 4950 Oe, a saturation magnetization ($\delta_s$) determined by the magnetic balance of 63.5 emu/g and a composition determined by chemical analysis of $Ba_{0.45}Sr_{0.45}Pb_{0.1}O.5.52Fe_2O_3$.

The above-mentioned novel hexagonal-system ferrite powder of the present invention is particularly useful as a raw material for preparing a plastic-ferrite composite magnet.

Generally, a plastic-ferrite composite magnet is prepared by kneading a thermoplastic resin with a ferrite powder. The ferrite powder herefore used for this purpose was in most cases one which was prepared by a dry process depending on a solid phase reaction. However, the ferrite powder prepared by the conventional dry process has various defects as already explained in detail hereinbefore. One important defect is that such prior art product does not have a satisfactory coercive force, which is one of the important characteristic properties of a plastic composite-magnet. In contrast, the novel hexagonal-system ferrite powder according to the present invention has a surprisingly high coercive force and a good miscibility with a thermoplastic resin and accordingly is very suitable for making a plastic-ferrite composite magnet.

When a plastic-ferrite composite magnet is prepared from a hexagonal-system ferrite powder by mixing with any of the various plastic materials, the magnetic properties of the product are most strongly affected by the magnetic properties of the hard ferrite powder used as a raw material and its proportion in the resulting mixture. As regards the currently available plastic-ferrite composite magnet, the maximum proportion of a ferrite powder in the composite is considered to be in the range of 85 - 90%. For this reason, the magnetic properties of such plastic-ferrite composite magnet are limited to such values as, for example, a maximum coercive force ($_jH_c$) in the range of 2500 – 3000 Oe and a maximum surface magnetic flux density in the range of 700 – 850 G. The present inventors investigated ways to exceed such limits and developed a novel plastic-ferrite composite magnet having improved characteristic properties. Their investigation was directed to two goals: one was to improve the magnetic properties of the ferrite powder itself, and the other was to develop a raw material which has improved miscibility with various plastic materials.

As already mentioned, the ferrite powder obtained by a conventional dry process has to be mechanically crushed in the later step to reduce the grain size to the order of several microns, and this causes remarkable impact strains in the grains. Because of these strains, the magnetic properties of the product, particularly its coercive force, are greatly decreased. For this reason, post-treatment such as annealing is often required. In addition, mechanical crushing is accompanied by other defects, such as unevenness in the shape and size of the grain.

A wet process is also known in the art. The ferrite powder obtained in a liquid phase is free from the defects peculiar to the above mentioned dry process product, and it is known that the orientation (which is important in mixing with a plastic material) of the grains of the ferrite powder obtained by a wet process is remarkably superior to that obtained by a dry process. However, the ferrite powder obtained by the conventional wet process had a defect in that the grain size is too fine and its miscibility with plastic material is not as good as that of the powder obtained by a dry process.

In contrast, the novel process of the present invention comprises a combination of a wet process and a dry process. The ferrite powder obtained by this process is free from the defects of both the conventional dry and wet processes, and is particularly suitable for use as a raw material for the production of a plastic-ferrite composite magnet. The ferrite powder has a superior coercive force and has good miscibility with various plastic materials. The process for preparing such ferrite powder is given in detail hereinbefore.

The ferrite powder which is used for preparing a plastic-ferrite composite-magnet according to the present invention is prepared by a process comprising the first and second steps as explained in detail hereinbefore.

The term "co-precipitated product obtained in a liquid phase" used in the specification and the attached claims means, without specific reference thereto, the co-precipitated product obtained in the first step of the process of the present invention. If the hexagonal-system ferrite powder obtained by carrying out both the first and the second steps is subjected to further calcination treatment in a heat-treating furnace at a temperature in the range of 700° – 900° C. for 1 – 3 hours, the grain size of the hexagonal ferrite will grow until it reaches 1.0 – 7.0 microns. This gives an improved ferrite powder having improved miscibility and a narrower distribution of grain size. The product thus obtained exhibits almost completely the diffraction pattern of magnet plumbite, thereby proving the satisfactory completion of the ferrite-forming reaction. The powdered product thus obtained can be reduced by a simple means into individual grains to be used as a raw material for ferrite product.

Plastic materials which can be used in the practice of the present invention for preparing a plastics composite-magnet by mixing with ferrite powder include any of the known thermoplastic resins which can be molded by compression molding, extrusion molding or injection molding.

The mixing ratio of the ferrite powder to a plastic material is arbitrary, depending on the intended purpose. However, as already explained, when ferrite powder prepared by the prior art process was used, the limit of ferrite powder in the mixture ranged from 85 – 90%. In contrast, when the novel ferrite powder according to the present invention is used, the proportion of ferrite powder in the mixture of the ferrite powder and a plastic material can range as high as from 92 – 95%. This is one very important advantage brought about by the present invention. The numerical limitation with respect to the mixing proportion given in the claim thus refers to the maximum and does not mean that a lower proportion cannot be employed.

Kneading of the ferrite powder and a plastic material can be carried out with any of the known types of kneaders. The mixture of a plastic material and the ferrite powder of the present invention has a good fluidity. Thus, if such mixture is molded by, for example, extrusion molding, either a plunger type or screw type machines can be used. As regards molding conditions, a cylinder temperature in the range of 150° – 250° C. and an extrusion pressure in the range of 500 – 1500 kg/cm$^2$ can be employed conveniently.

In one preferred embodiment of the present invention, a plastic-ferrite composite magnet of a barium-ferrite powder and a methacrylate resin is made in the manner as mentioned below. First, as a raw material, a ferrite powder which has been prepared in a liquid phase by the manner mentioned above is used. Namely, the ferrite powder to be used as a raw material is one which has been prepared by the process comprising the steps of producing a co-precipitated product for preparing the hexagonal-system ferrite in a liquid phase, and calcining the resulting co-precipitated product at a temperature in the range of 400° – 600° C., which is much lower than the temperature employed in a conventional dry process which depends on a solid phase reaction, or alternatively the hexagonal-system ferrite powder thus obtained is further calcined in a heat-treating furnace at a temperature in the range of 700° – 900° C. for 1 – 3 hours to obtain a product having an average grain size in the range of 1.0 – 7.0 microns and an improved miscibility.

On the other hand, 0.1 – 0.5% by weight of sulfurous acid used as a catalyst is added to methyl methacrylate which is polymerized into a visous syrup having a degree of polymerization in the range of about 10 – 30% by heat polymerization, and the resulting syrup is admixed with a ferrite powder to make a composite plastic-ferrite magnet.

Based on the amount of the syrup thus obtained, 92% by weight or more of the ferrite powder was mixed therewith and the mixture was fully kneaded by a conventional kneading machine. One example of the plastic-ferrite composite magnet thus prepared exhibits the following characteristic properties: a proportion of ferrite powder in the mixture in the range of 92 – 95% by weight based on the amount of the mixture of the ferrite powder and the plastic material component, a coercive force ($_jHc$) in the range of 3200 – 3800 Oe, a surface magnetic flux density in the range of 850 – 1200

G and a saturation magnetization ($\delta_s$) in the range of 50 - 65 emu/g. In contrast, one example of the prior art plastic-ferrite composite magnet having incorporated therein 90% by weight of a ferrite powder (maximum value) was observed to have a coercive force ($_jHc$) of 2800 Oe, a surface magnetic flux density of 750 - 800 G, and a saturation magnetization ($\delta_s$) of 45 - 50 emu/g. Thus, obviously, the plastics composite-magnet of the present invention is substantially superior to the prior art product of a plastic-ferrite composite magnet.

The novel ferrite powder prepared by the process including said first and second steps has improved magnetic properties including a coercive force ($_jHc$) of as high as 4800 - 5300 Oe and a saturation magnetization ($\delta_s$) of as high as 50.0 - 65.0 emu/g. These extremely high numerical values were never achieved by prior art processes. Such plastic-ferrite composite-magnet containing at least 92% by weight of ferrite powder is an excellent plastic composite-magnet which could not exist heretofore.

The following examples are given to illustrate but not to limit the present invention.

EXAMPLE 6

A co-precipitated product for making hexagonal-system ferrite was produced in a liquid phase, and the precipitate was then calcined at 450° C. for 2 hours to provide $BaO.6Fe_2O_3$ powder, and it was calcined again at 800° C. for 1 hour to obtain a ferrite powder having good miscibility with a plastic material. The ferrite powder thus obtained was disintegrated by a simple mmeans before it was added to a syrupy polymer to admix therewith which had been prepared separately by heat polymerizing methyl methacrylate in the presence of 0.4% by weight of sulfurous acid as catalyst added thereto. The resulting mixture was molded by a screw extrusion molding machine into a plate 15 mm thick of a plastic-ferrite composite magnet.

The proportion of the ferrite powder mixed with a plastic material was 93% by weight based on the amount of the plastic-ferrite composite magnet. Magnetic properties determined by measuring a test specimen taken out of the plastic plate mentioned above included a coercive force ($_jHc$) of 3500 Oe, a surface magnetic flux density of 1050 G, and a saturation magnetization ($\delta_s$) of 55.5 emu/g.

EXAMPLE 7

A powder of $SrO.6FeO_3$ prepared in a manner similar to that used in Example 6 was kneaded with a methacrylate resin as mentioned in Example 6 to make therefrom a plastic composite-magnet plate 15 mm thick. The proportion of ferrite powder mixed with the plastic material was 92% by weight based on the amount of the plastic-ferrite compsite magnet. A test specimen was taken out of the plastic plate and the magnetic properties thereof were measured. The coercive force was 4100 Oe, the surface magnetic flux density was 1000 G and the saturation magnetization ($\delta_s$) was 53.8 emu/g.

EXAMPLE 8

A powder of $Ba_{0.75}.Sr_{0.25}O.6Fe_2O_3$ prepared in a manner similar to that used in Example 6 was kneaded with a methacrylate resin as in Example 6 and a plastic-ferrite compsite magnet plate 15 mm thick was made therefrom. The proportion of the ferrite powder mixed with a plastic material was 93% by weight based on the amount of the plastic-ferrite composite magnet. A test specimen taken out of the resulting magnet plate exhibited magnetic properties including a coercive force ($_jHc$) of 4600 Oe, a surface magnetic flux density of 1110 G and a saturation magnetization ($\delta_s$) of 56.1 emu/g.

EXAMPLE 9

A powder of $Ba_{0.45}Sr_{0.45}Pb_{0.10}O.6Fe_2O_3$ prepared in a manner similar to that used in Example 6 was kneaded with a methacrylate resin as mentioned and a similar plastic composite magnet plate was prepared therefrom. The proportion of the ferrite powder based on the amount of plastic-ferrite composite magnet was 93%. Magnetic properties, determined in similar manner included a coercive force of 4200 Oe a surface magnetic flux density of 1050 G and 58.5 emu and a saturation magnetization ($\delta_s$) of 58.5 emu/g.

What we claim is:

1. A process for the production of a plastic-ferrite composite magnet which comprises: contacting a ferrous salt and a salt of Ba, Sr, Pb or Ca with an alkali in a liquid phase to form a co-precipitated product of Fe(OH)$_2$ and MCO$_3$, wherein M represents Ba, Sr, Pb or Ca, keeping the co-precipitated product thus obtained in the solution at a pH of from 9 to 12 and at a temperature of from 50° to 80° C., blowing air into the solution at a substantially constant rate to form fine bubbles for the purpose of oxidizing part of the Fe(OH)$_2$ formed in the solution to Fe(OH)$_3$, thereby converting a substantial part of the precipitated Fe(OH)$_2$ to Fe$_3$O$_4$ precipitate which has good filtering characteristics, is substantially free from alkalis and other co-existing ions and has a narrow distribution of grain size, calcining the co-precipitated product thus obtained at a temperature of from 400° to 900° C. to form a hexagonal-system ferrite powder; and kneading the hexagonal-system ferrite powder thus obtained with a thermoplastic resin.

2. The process of claim 1 wherein the co-precipitated product is calcined at a temperature of 400° to 600° C.

3. The process of claim 2 wherein the hexagonal-system ferrite powder thus obtained is subjected to further calcination treatment in a heat-treating furnace at a temperature of from 700° to 900° C. for from 1 to 3 hours to obtain a hexagonal-system ferrite powder having an average grain size of from 1.0 to 7.0 microns.

4. The process as defined in claim 3 in which from 92 to 95 parts by weight of the hexagonal-system ferrite powder is kneaded with from 5 to 8 parts by weight of the thermoplastic resin.

5. The process as defined in claim 2 in which from 92 to 95 parts by weight of the hexagonal-system ferrite powder is kneaded with from 5 to 8 parts by weight of the thermoplastic resin.

6. The process of claim 1 wherein the hexagonal-system ferrite powder thus obtained is subjected to further calcination treatment in a heat-treating furnace at a temperature of from 700° to 900° C. for from 1 to 3 hours to obtain a hexagonal-system ferrite powder having an average grain size of from 1.0 to 7.0 microns.

7. The process as defined in claim 6 in which from 92 to 95 parts by weight of the hexagonal-system ferrite powder is kneaded with from 5 to 8 parts by weight of the thermoplastic resin.

8. The process as defined in claim 1 in which from 92 to 95 parts by weight of the hexagonal-system ferrite powder is kneaded with from 5 to 8 parts by weight of the thermoplastic resin.

9. A product formed by the process of claim 1 comprising from 92 to 95 parts by weight of said hexagonal-system ferrite and from 8 to 5 parts by weight of a thermoplastic resin, said powder having a coercive force ($_jHc$) of from 4800 to 5300 oersted (Oe) and a saturation magnetization ($\delta_s$) of from 50.0 to 65.0 emu/g.

* * * * *